(No Model.)

W. H. RYAN.
BORING AND TENONING MACHINE.

No. 276,476. Patented Apr. 24, 1883.

WITNESSES:
Thos. Houghton.
Edw. A. Byrn.

INVENTOR:
Wm. H. Ryan
BY Mann & Co.
ATTORNEYS.

UNITED STATES PATENT OFFICE.

WILLIAM H. RYAN, OF BELTON, TEXAS.

BORING AND TENONING MACHINE.

SPECIFICATION forming part of Letters Patent No. 276,476, dated April 24, 1883.

Application filed January 31, 1883. (No model.)

*To all whom it may concern:*

Be it known that I, WILLIAM H. RYAN, of Belton, in the county of Bell and State of Texas, have invented a new and useful Improvement in a Combined Hollow Auger Attachment and Felly-Boring Machine; and I do hereby declare that the following is a full, clear, and exact description of the same, reference being had to the accompanying drawings, forming part of this specification, in which—

Figure 1:
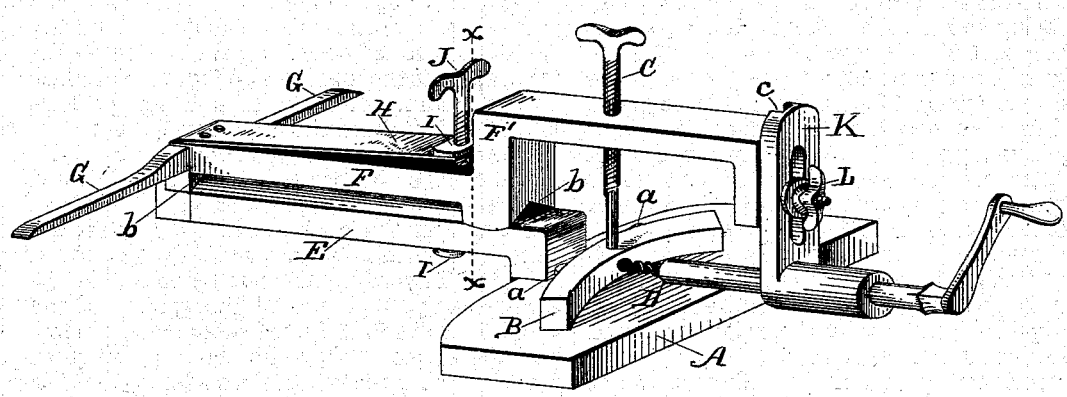
Figure 2:
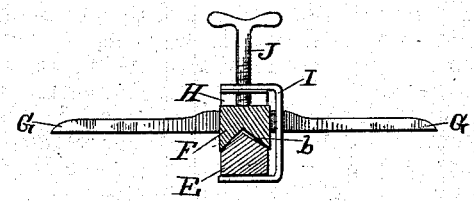

Figure 1 is a perspective view, showing the device as arranged for boring the fellies; and Fig. 2 is a cross-section through the line $x\ x$.

My invention relates to an improved felly-boring machine which is adapted with slight adjustment to co-operate with a hollow auger for forming the tenons on the spokes.

My invention consists in the construction of the frame, the clamp for securing it to the spokes or felly-supports, and in the means for holding and adjusting the auger, all combined as hereinafter fully described.

In the drawings, which show the adjustment of the machine for boring the felly, A represents a table or support for the felly, which table has two lugs, $a\ a$, against which the outer curve of the felly-section bears to resist the boring strain.

B is the felly-section, which is clamped upon its table by a binding-screw, C; and D is the auger for boring the hole in the felly. The felly-table is provided with an arm, E, whose upper edge is V-shaped, and upon which rests the V-shaped bearings $b\ b$ of the main frame F F'. This frame has its section F parallel with the arm E, while the section F' rises vertically from section F, and then passes horizontally, giving a bearing for the binding-screw C, and at its end turns down again. At the outer end of the section F of the main frame there are two arms, G G, projecting at right angles, while just above said section is a spring, H, having at its end a clamp, I, that extends around both the part F of the frame and the arm E of the felly-table, and said clamp is provided with a screw, J, by which the frame F F' and the felly-table and arm can be tightly clamped together. Upon the downwardly-projecting outer end of the elevated part F' of the main frame is formed a rib, which is received into a groove, $c$, in a slotted slide, K, which latter is adjustably clamped to the frame F' by a set-screw, L, and which slide carries at its lower end a hollow sleeve, which forms the guide through which the boring-tool works.

Now, in operating the machine for boring the fellies the felly-sections are placed on the table against the lugs $a\ a$ and fastened in place by the binding-screw C. The sliding guide K is then adjusted vertically by its set-screw until the boring-tool is in the center of the felly, and the auger or boring-tool is then rotated against the felly to bore the hole. To form the tenon on the spokes, after the latter are fixed in the hub, the frame F F' is removed from the felly-table and arm by releasing the screw-clamp, and one of the spokes of the wheel is made to fit in the seats or bearings $b\ b$ of the frame F F', while the right-angular arms G G bear against the two adjacent spokes to hold the frame steady on the wheel. The binding-screw C is now raised out of the way and a hollow auger substituted for the plain auger D, and this being adjusted by means of the sliding guide K so that it fits onto the end of the spoke, the hollow auger is then rotated and made to cut the tenon on the spoke.

Having thus described my invention, what I claim as new is—

1. The frame F F', having arms G at one end and seats $b\ b$ at the side, combined with spring H, clamp I, connected to frame, substantially as shown, and adjustable auger-guide K, substantially as described.

2. The frame F F', with seats $b\ b$, spring H, clamp I, which retains frame F to bar E, binding-screw C, for holding the work, and adjustable auger-guide K, combined with the felly-table, having lugs $a\ a$ and arm E, substantially as described.

WILLIAM H. RYAN.

Witnesses:
W. W. UPSHAM,
H. C. SURGHNOR.